United States Patent [19]
Abbey

[11] Patent Number: 6,151,354
[45] Date of Patent: Nov. 21, 2000

[54] MULTI-MODE, MULTI-BAND, MULTI-USER RADIO SYSTEM ARCHITECTURE

[75] Inventor: Duane L. Abbey, Cedar Rapids, Iowa

[73] Assignee: Rockwell Science Center, Thousand Oaks, Calif.

[21] Appl. No.: 08/994,954

[22] Filed: Dec. 19, 1997

[51] Int. Cl.[7] ................................................ H04B 3/36
[52] U.S. Cl. ........................ 375/211; 455/132; 455/140
[58] Field of Search .......................... 455/74, 84, 180.1, 455/188.1, 426, 552, 553, 132, 137, 140, 143, 454, 463, 168.1; 375/219, 308, 330, 347, 267, 211

[56] References Cited

U.S. PATENT DOCUMENTS

| | | | |
|---|---|---|---|
| 2,586,894 | 2/1952 | Williams et al. | 250/20 |
| 4,395,772 | 7/1983 | Trested, Jr. | 340/825.01 |
| 4,425,642 | 1/1984 | Moses et al. | 370/76 |
| 4,672,629 | 6/1987 | Beier | 375/1 |
| 4,841,544 | 6/1989 | Nuytkens | 375/1 |
| 4,943,976 | 7/1990 | Ishigaki | 375/1 |
| 4,953,178 | 8/1990 | Ishigaki | 375/1 |
| 4,979,183 | 12/1990 | Cowart | 375/1 |
| 5,029,180 | 7/1991 | Cowart | 375/1 |
| 5,073,899 | 12/1991 | Collier et al. | 375/1 |
| 5,142,553 | 8/1992 | Rosenkranz | 375/75 |
| 5,157,686 | 10/1992 | Omura et al. | 375/1 |
| 5,170,412 | 12/1992 | Massey | 375/1 |
| 5,177,765 | 1/1993 | Holland et al. | 375/1 |
| 5,181,225 | 1/1993 | Neeser et al. | 375/1 |
| 5,189,683 | 2/1993 | Cowart | 375/1 |
| 5,228,055 | 7/1993 | Uchida et al. | 375/1 |
| 6,023,603 | 2/2000 | Matsubara | 455/3.2 |

*Primary Examiner*—Stephen Chin
*Assistant Examiner*—Mohammad Ghayour
*Attorney, Agent, or Firm*—Nathan O. Jensen; Kyle Eppele; J. P. O'Shaughnessy

[57] ABSTRACT

A multi-mode, multi-band, multi-user radio system architecture includes four channels of exciter circuits and receiver circuits coupled to a digital signal processing array. Each of the exciter and receiver circuits includes three separate signal paths for three separate frequency ranges of analog signals. Each path includes an analog-to-digital converter or a digital-to-analog converter for converting both modulated analog signals to modulated digital signals and modulated digital signals to modulated analog signals. The digital signal processing array performs modulation and demodulation functions for the radio system.

9 Claims, 9 Drawing Sheets

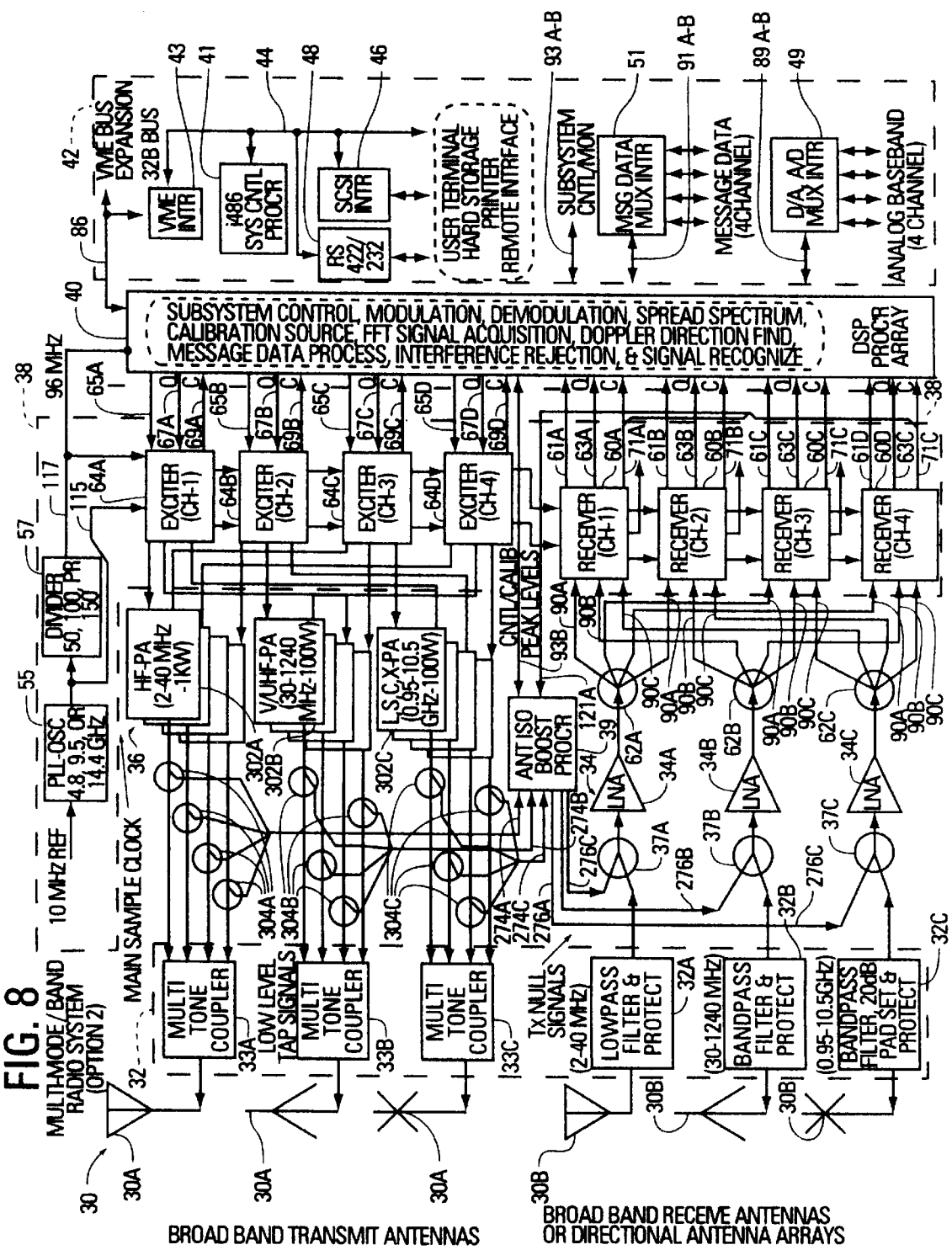

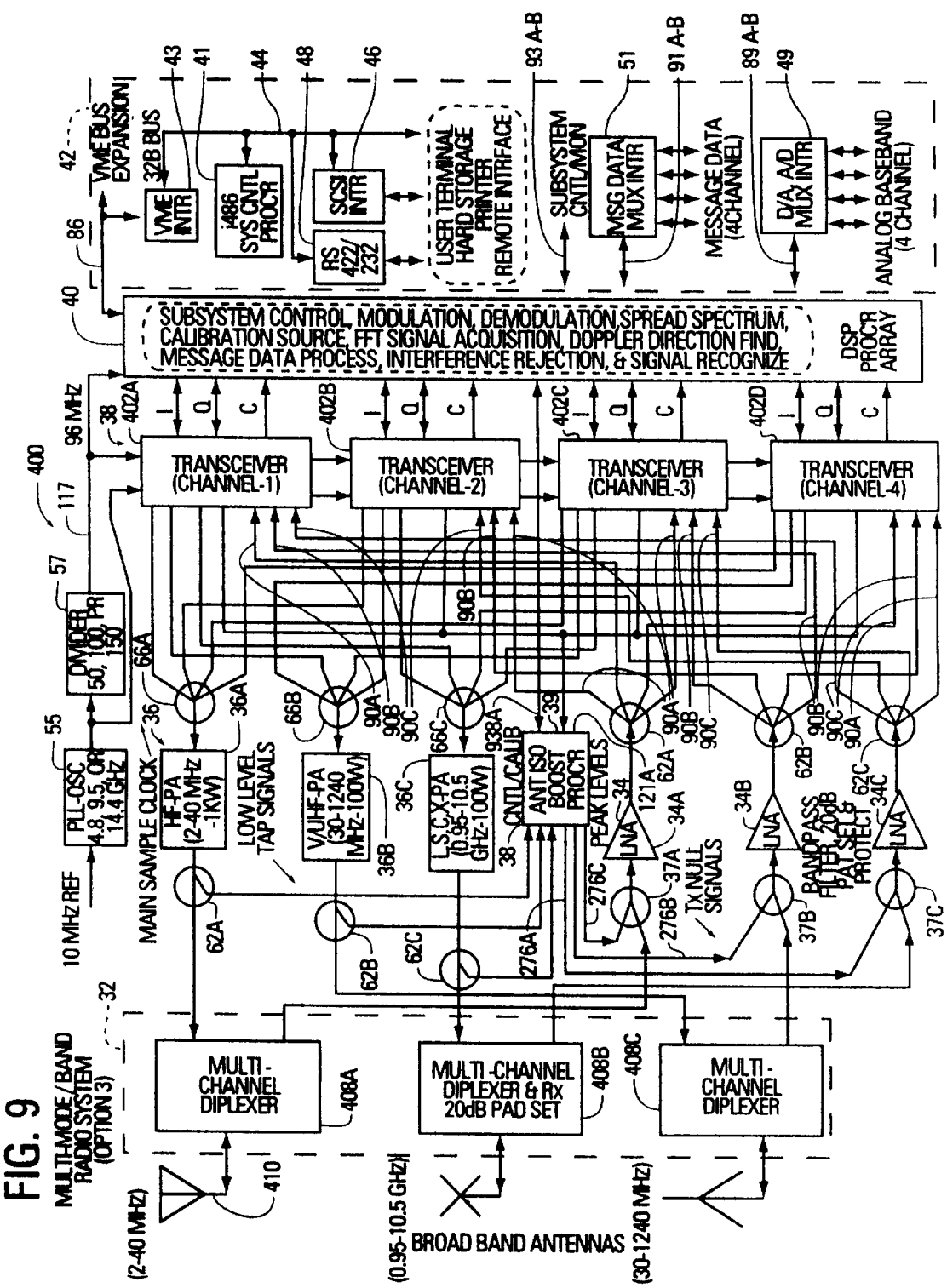

MULTI-MODE, MULTI-BAND, MULTI-USER RADIO SYSTEM ARCHITECTURE

FIELD OF THE INVENTION

The present invention relates to a radio system. More particularly, the present invention relates to an architecture for a radio transceiver capable of any one or more of multi-band, multi-user, or multi-mode operations.

BACKGROUND OF THE INVENTION

Civilian and military radio systems can be implemented on different platforms to perform diverse communication functions. Platforms can include backpacks, satellites, vehicles, naval vessels, aircraft, shelters, or other structures. Radio systems can even be hand-held systems. The diverse communication functions can involve the reception and the transmission of voice, data, or both by computer equipment or by personnel.

Radio systems operate in various modes, including voice and data modes, and transmit information in a number of frequency bands (L band, S band, C band, X band, VHF band, UHF band, HF band, and other frequency bands). Often, multiple users (personnel or equipment) on a single platform can simultaneously require radio services. The radio services can involve simplex and duplex communications in the various modes and on the various bands. For example, on an aircraft platform, a radio operator could be participating in a voice communication in the VHF band on one radio unit while navigational equipment communicates data in the L band via another radio unit. Thus, platforms can require simultaneous use of radio services in multiple modes and in multiple bands.

Heretofore, simultaneous independent radio operations have generally required separate, distinct radio units. Additionally, the distinct radio units are generally configured for use in a single mode and in a single band. Separate radio units for each user, mode, and band add to the cost of providing radio services on the platform. Further, separate radio units add to the power requirements and to the weight of the platform.

Conventional radio systems, especially co-spectrum frequency hopping systems, do not have high quality reception at the necessary receiver sensitivity levels for simultaneous operations. The high quality reception problem can be due to the high level transmit noise floor compared to the sensitivity level of the receiver. Also, the high quality reception problem can be due to high levels of transmitted intermodulation, harmonic, and spurious distortion which cause the automatic gain control of the receiver to reduce the gain and, thereby, degrade the sensitivity level. Additionally, the high quality reception problem can be due to concurrent high/low signal reception levels (e.g., the near/far reception problem). The near/far reception problem can cause the gain of the receiver to be reduced for the high level signal, thereby burying the low level signal in receiver noise.

Conventional radio systems have relied on analog designs that include analog intermediate frequency (IF) circuits and analog modulation and demodulation circuits. The analog designs are configured for single user, single mode, and single band operations and generally do not allow programmability or flexibility for multi-mode, multi-band, and multi-user radio services.

To the extent conventional radio systems include digital base band circuitry, analog IF circuitry is still required to convert the base band signal to/from a radio frequency (RF) band and to perform gain control functions. Further, the conversion band width of these conventional systems is fairly narrow and is usually below 10 megahertz (MHz).

Thus, there is a need for a radio system architecture that supports high dynamic range in multiple bands and simultaneous operation. Further, there is a need for a radio system which is multi-band, multi-mode, and multi-user. Even further still, there is a need for a radio system which includes a direct sampling receiver (DSR) and a direct digital transmitter (DDT) architecture.

SUMMARY OF THE INVENTION

The present invention relates to a multi-mode, multi-band radio system. The radio system includes a receiver means, a transmitter means, and a digital processing means, the receiver means receives modulated analog signals and generates receives modulated digital signals representative of the receive modulated analog signals. The receive modulated analog signals are in a first receive frequency range or in a second or additional receive frequency ranges. The receive modulated analog signals in the first frequency range are directly converted to the received modulated digital signals. The digital processing means receives the receive modulated digital signals and demodulates the receive modulated digital signals. The processing means generates transmit modulated digital signals. The transmitter means receives the transmit modulated digital signals and generates transmit modulated analog signals representative of the transmit modulated digital signals. The transmit modulated analog signals are in a first transmit frequency range or in a second or additional transmit frequency ranges. The transmit modulated digital signals are directly converted to the transmit modulated analog signals in the first transmit frequency range. The modulated receive analog signals can be received simultaneously, and the modulated transmit analog signals can be transmitted simultaneously.

The present invention still further relates to a multi-user, multi-mode, multi-band radio system that includes an antenna interface, a plurality of receiver channel circuits, an analog-to-digital converter, and a digital down converter. The antenna interface receives radio frequency signals. Each of the receiver channel circuits includes a first receiver channel path, a second receiver channel path, and a third receiver channel path coupled in series. The third receiver channel path converts the radio frequency signals in the third frequency range to a second frequency range. The second receiver channel path converts the radio frequency signals in the second frequency range to a first frequency range. The first receiver channel path provides analog signals in the first frequency range to a receiver output. The analog-to-digital converter is coupled to the receiver output and receives the analog signals at the receiver output in the first frequency range and provides a digital signal at a converter output. The digital down converter is coupled to the analog-to-digital converter output.

The present invention even further relates to a multi-user, multi-mode, multi-band radio system that includes an antenna interface for transmitting radio frequency signals, exciter channel circuits, a digital-to-analog converter coupled to an analog exciter input, and a digital up converter coupled to a digital-to-analog converter input. Each of the exciter channel circuits includes a first exciter channel path, a second exciter channel path, and a third exciter channel path coupled in cascade. The second exciter channel path converts radio frequency signals in a first frequency range to a second frequency range. The third exciter channel path converts the radio frequency signals in the second frequency range to a third frequency range. The first exciter channel path receives the radio frequency signals in the first frequency range at the analog exciter input. The digital-to-analog converter provides the radio frequency signals at the exciter input in the first frequency range.

The present invention further relates to an architecture for a radio system. The architecture includes an antenna, receiver channels, a digital signal processing array, and transmitter channels. Each receiver channel is coupled to the antenna to receive modulated analog signals. Each receiver channel generates receive modulated digital signals representative of the receive modulated analog signals. The receive modulated analog signals are in a first receive frequency range or in a second receive frequency range. The receive modulated analog signals in the first frequency range are directly converted to the receive modulated digital signals. The digital signal processing array is coupled to the receiver channels. The array demodulates the receive modulated digital signals. The array generates transmit modulated digital signals. The transmitter channels are coupled to the array and to the antenna. Each transmit channel receives the transmit modulated digital signals and generates transmit modulated analog signals representative of the transmit modulated digital signals. The transmit modulated analog signals are in a first transmit frequency range or in a second transmit frequency range. The transmit modulated digital signals are directly converted to the transmit modulated analog signals in the first transmit frequency range. The modulated receive analog signals can be received simultaneously, and the modulated transmit analog signals can be transmitted simultaneously.

According to one exemplary aspect of the present invention, the radio system architecture more directly implements the transition from both radio frequency (RF) to digital and digital to RF to retain high performance under multi-user and wide band width conditions. The architecture includes high resolution analog-to-digital (A/D) and digital-to-analog (D/A) converters directly converting signals for a high frequency (HF) (e.g., 2–40 MHz) band. Separate analog conversion paths are utilized to convert the HF signals to higher bands in transmit modes and to convert higher bands to the HF band in the receive mode. Preferably, the radio system utilizes three overlapping bands for enhanced performance with respect to antennas, power outputs, and receiver sensitivity.

In accordance with yet another aspect of the present invention, an extremely versatile, highly adaptive, high dynamic range, and fast-responding full duplex communication system communicates voice signals and data in an extended HF band, an extended VHF band, a UHF band, an L band, an S band, a C band, and an X band. Four separate receiver and four separate exciter channel circuits are provided to support reception and transmission of a minimum of four signals anywhere between the extended HF and X bands. A digital signal processing array handles modulation and demodulation functions for the operating bands.

BRIEF DESCRIPTION OF THE DRAWINGS

The invention will hereafter be described with reference to the accompanying drawings, wherein like numerals denote like elements and:

FIG. 8 is a detailed block diagram of the radio system illustrated in FIG. 1 in accordance with yet another exemplary embodiment of the present invention, wherein the radio system further includes four power amplifiers in each frequency range; and FIG. 9 is a detailed block diagram of the radio system illustrated in FIG. 1 in accordance with still another exemplary embodiment of the present invention, wherein the radio system further includes four half duplex transceiver channel circuits.

DETAILED DESCRIPTION OF PREFERRED EXEMPLARY EMBODIMENTS

Figure 1:
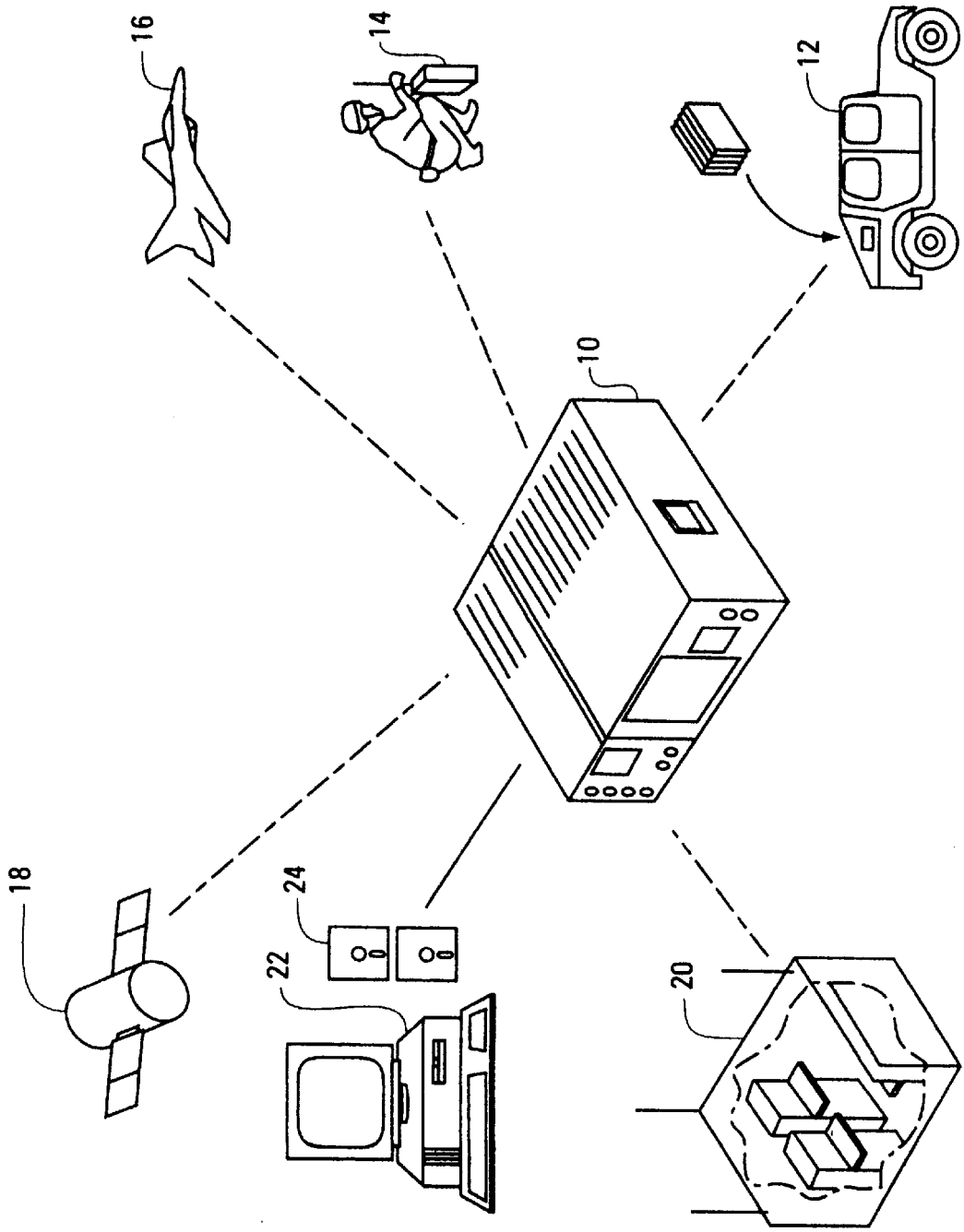
FIG. 1 is a schematic illustration of a radio system in accordance with an exemplary embodiment of the present invention.

With reference to FIG. 1, a radio system 10 is a multi-mode, a multi-user, and a multi-band radio which can be utilized on a vehicular platform 12, a backpack platform 14, an airborne platform 16, a satellite platform 18, or a shelterized platform 20. Additionally, system 10 can be utilized as the basis for a hand-held device. Furthermore, system 10 can be used in naval applications, in helicopter applications, in numerous military and civilian applications, or in other devices. System 10, in the example configurations, can support up to four simultaneous, independent users communicating in different modes and on different bands. System 10 can transmit and receive radio frequency (RF) signals in the 2 megahertz (MHz) to 10 gigahertz (GHz) frequency range. System 10 can transmit data at a rate from 10 bits per second (B/S) to 64 kilobits per second (KB/s) or more. Preferably, separate channel bandwidths which are optimized for each RF signal are up to 5 MHz or more.

Radio system 10 can be programmed by a computer or a workstation 22 via a programmable interface. System 10 can be programmed via a wireless or hard-wired network or via floppy disk 24. Alternatively, hardware inserts, hardware cards, or software configuration devices can be utilized to configure system 10 for various applications. Radio system 10 is preferably configured before a mission. Additionally, radio system 10 can have online reconfiguration capabilities to respond to changing mission conditions that arise from user inputs and signal requirements.

Figure 2:
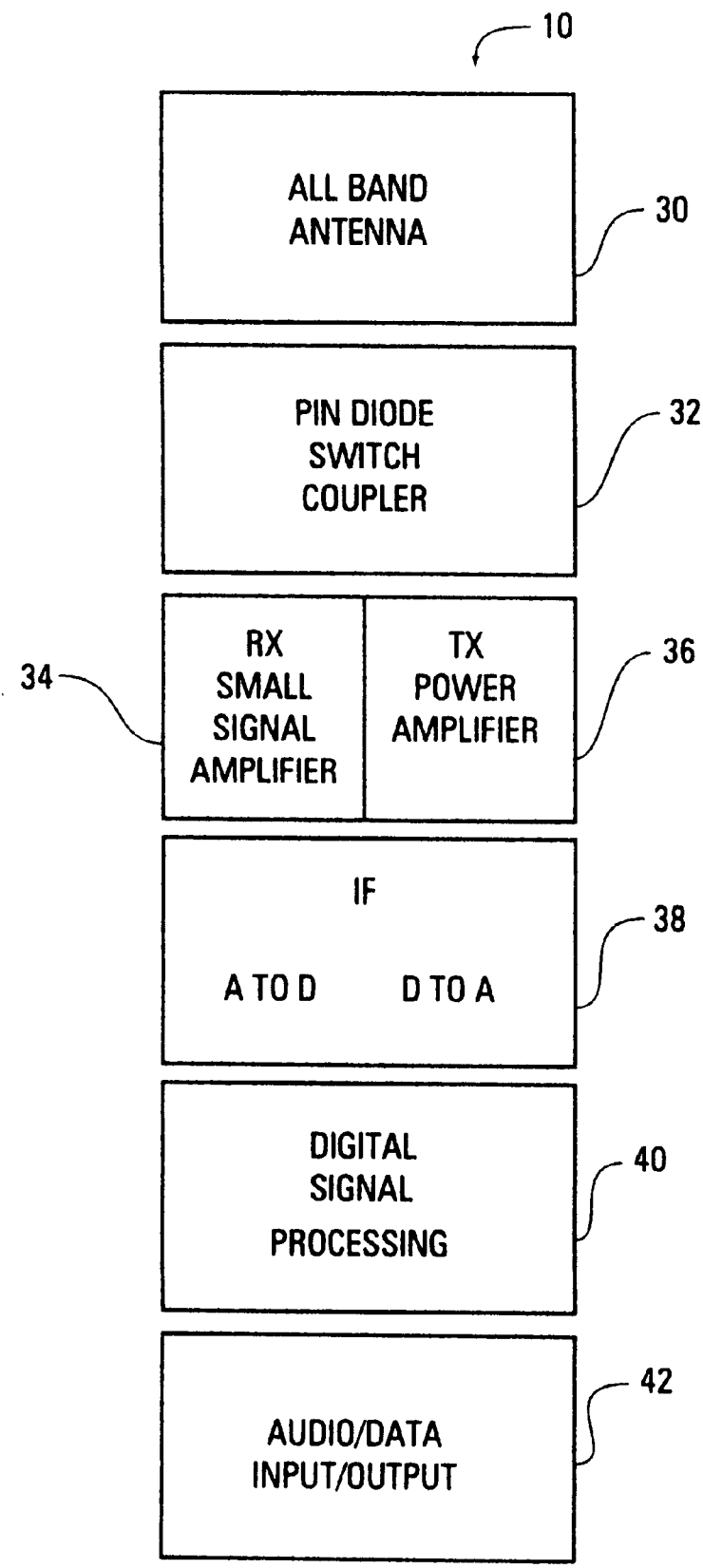
FIG. 2 is a general schematic block diagram of the radio system illustrated in FIG. 1.
Figure 3:
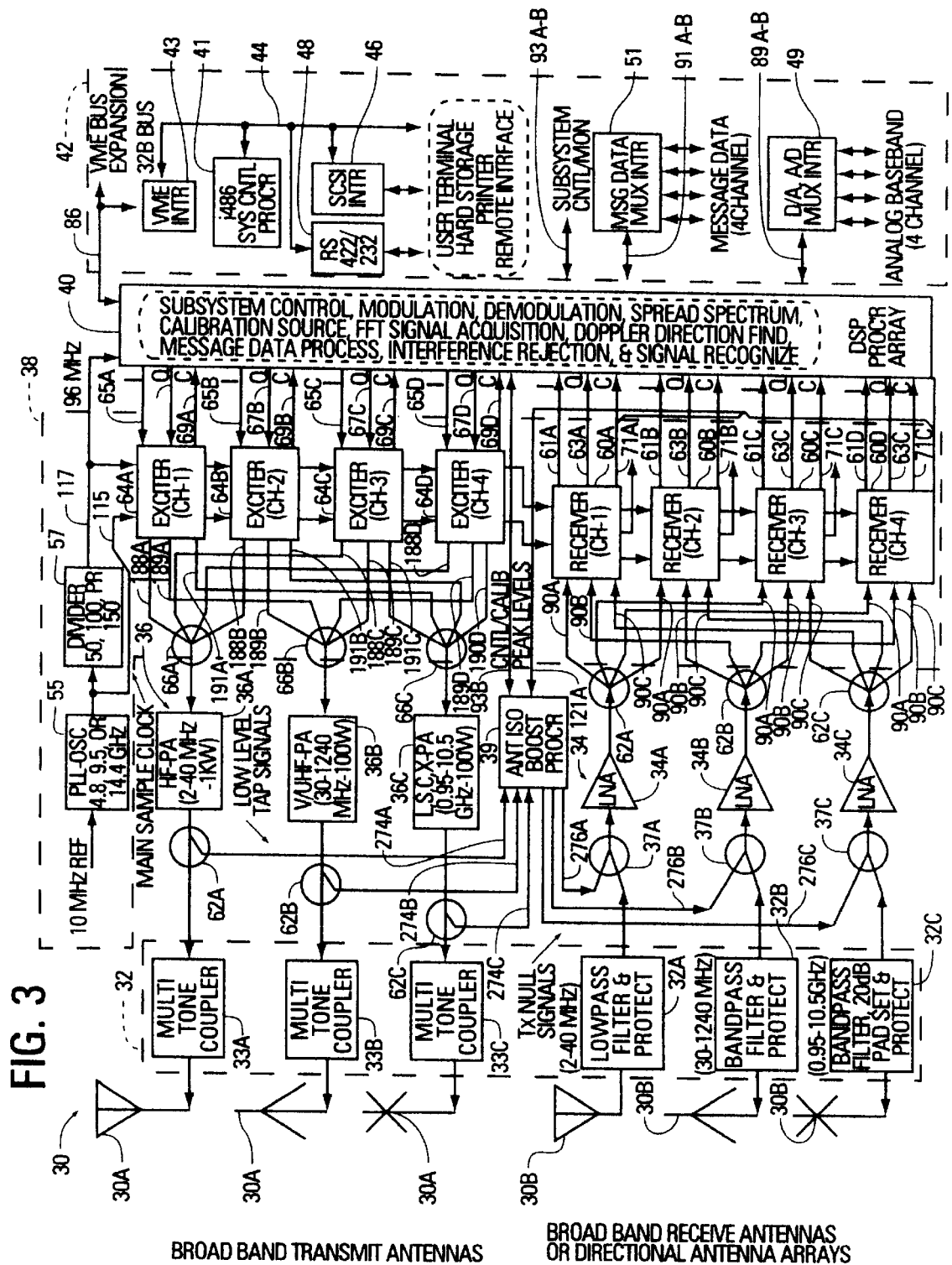
FIG. 3 is a more detailed schematic block diagram of the radio system illustrated in FIG. 2, wherein the system includes a processor array, four receiver channel circuits, four exciter channel circuits, and an antenna isolation processor in accordance with another exemplary embodiment of the present invention.

With reference to FIGS. 2 and 3, system 10 includes an all-band antenna system 30, a pin diode switch coupler 32, an amplifier stage (comprised of a receive low-noise amplifier (LNA) 34 and a transmit power amplifier (PA) 36), an intermediate frequency (IF) circuit 38, an antenna isolation boost processor 39 (FIG. 3), a digital signal processing (DSP) processor array 40, and an audio and data input/output interface 42. All-band antenna 30 includes a transmitting antenna 30A (FIG. 3) and a receiving antenna 30B. Pin diode switch coupler 32 includes filter and protection circuits 32A–C for protecting amplifier 34 and multi-tone couplers 33A–C for filtering operations and for impedance matching amplifier 36 to antenna 30A.

Amplifier 34 includes three low-noise amplifiers 34A–C coupled to circuits 32A–C through passive combiners 37A–C. Circuits 32A–C separate RF signals received on antennas 30B to three overlapping frequency ranges, such as, 2–40 MHz, 30–1240 MHz, or 0.95–10.5 GHz. Amplifiers 34A–C are coupled through passive directional taps 62A–C to IF circuit 38.

IF circuit 38 includes an oscillator 55, a divider 57, four exciter channel circuits 64A–D, and four receiver channel circuits 60A–D. Exciter channel circuits 64A–D are coupled to array 40 by I data inputs 65A–D, by Q data inputs 67A–D, and by clock outputs 69A–D. Receiver channel circuits 60A–D are coupled to array 40 by I data outputs 61A–D, by Q data outputs 63A–D, and by clock outputs 71A–D. Oscillator 55 and divider 57 provide a single clock source for system 10. The single source reduces spurious signals in system 10.

Exciter channel circuits 64A–D are coupled through passive combiners 66A–C to power amplifiers 36A–C of transmit power amplifier 36. Amplifiers 36A–C are configured to amplify RF signals in three overlapping frequency ranges, such as, 2–40 MHz, 30–1240 MHz, and 0.95–10.5 GHz. Power amplifiers 36A–C are coupled through multitone couplers 33A–C and passive directional taps 62A–C to transmit antenna 30A.

Transmit antenna 30A is a broad band transmit antenna, and antenna 30B is a broad band or directional receive antenna. Antennas 30A and B can be a single antenna or an antenna array.

Array 40 is coupled by a multibit (VME) bus 86 to interface 42, which includes a control processor 41, a VME interface 43, an (ISA) or (PCI) a VME bus 44, a SCSI interface 46, an RS 422/232 interface 48, a D/A and A/D interface 49, and a data interface 51. Array 40 receives and transmits digital information representative of voice and data to and from interface 42.

Processor 41 is preferably a 486 processor coupled to a 32-bit bus, such as, bus 44. Processor 41 can communicate through interfaces 46 and 48 and bus 44 with standard local and remote devices, such as, user terminals, file storage devices, hard copy output devices, land line modems, or other communication equipment, to support specific installation, mission, and application requirements for system 10. Processor 41 can provide general system control functions for system 10.

User message data, such as, tacticle, computer, and teletype, can be provided to and from array 40 via buses 91A–B and data interface 51. Analog signals, such as, voice signals, modem signals, video signals, or other communication signals, can be provided to and from array 40 via busses 89A–B and interface 49. Interface 49 preferably supports straight pulse-code modulation (PCM) data processing operations at a 12 to 16-bit resolution. Array 40 is able to convert the PCM data to and from appropriate formats, such as, continuous variable slope delta (CVSD) signals, linear predictive coding (LPC) signals, or other formats. Similarly, message data to and from interface 51 can be formatted by array 40.

The general operation of radio system 10 is discussed below as follows. Modulated RF signals received by antenna 30B are provided through combiners 37A–C, low noise amplifiers 34A–C, and splitters 62A–C to four receiver channel circuits 60A–D. Amplifier 34A amplifies RF signals in the 2–40 MHz range. Amplifier 34B amplifies RF signals in the 30–1240 MHz range. Amplifier 34C amplifies RF signals in the 0.95–10.5 GHz range. Circuits 32A–C filter or select RF signals for amplifiers 34A–C.

Directional taps 62A–C allow the amplified RF signals from each of amplifiers 34A–C to be provided to any one of receiver channels 60A–D. Circuits 60A–D receive the amplified modulated RF signals from directional taps 62A–C and provide modulated digital signals as I data signals and Q data signals to array 40 at outputs 61A–D and 63A–D, respectively.

Array 40 is preferably configured to handle 32-bit I data signals and 32-bit Q data signals in parallel and at various programmable rates and band widths, such as, up to 20 MHz double-sided band width. Array 40 also performs subsystem control of processor 39, circuits 60A–D, and circuits 64A–D concurrently with the demodulation of the digital signals received from outputs 61A–D and 63A–D. Array 40 provides the digital base band signals to interface 42 as digital information representative of voice, data, or other information.

Array 40 receives digital base band signals from interface 42 for eventual transmission by system 10. Alternatively, array 40 can receive commands from interface 42 which cause array 40 to create digital base band signals. The digital base band signals can represent voice, data or other information. Array 40 provides modulated digital signals representative of the digital base band signals received from interface 42 to exciter channel circuits 64A–D. The modulated digital signals are provided as I and Q data signal inputs 65A–D and 67A–D, respectively.

Exciter channel circuits 64A–D provide RF modulated analog signals representitive of the modulated digital signals through combiners 66A–C to power amplifiers 36A–C. Combiners 66A–C allow each circuit 64A–D to utilize each amplifier 36A–C.

Amplifier 36A amplifies the modulated RF analog signals between 20 and 40 MHz. Amplifier 36B amplifies the RF analog signals between 30 and 1240 MHz. Amplifier 36C amplifies the RF analog signals between 0.95 and 10.5 GHz.

The RF analog signals are provided through multitone couplers 33A–C and directional taps 62A–C to transmit antenna 30A.

The RF analog signals from amplifiers 36A–C are also provided through antenna isolation boost processor 39 via directional taps 62A–C. Processor 39 is coupled to low-noise amplifiers 34A–C through combiners 37A–C. Antenna isolation boost processor 39 serves to provide inverse signals to the signals transmitted through antenna 30A. The inverse signals are filtered and attenuated to match the opposite of the transmitted signals which are received on antenna 30B. Combiners 37A–C, in effect, subtract the signals transmitted through antenna 30A from the signals received by antenna 30B, thereby suppressing reception in circuits 60A–D of signals transmitted by system 10. Thus, processor 39 advantageously reduces near/far problems associated with simultaneous duplex communication by system 10.

Figure 4:
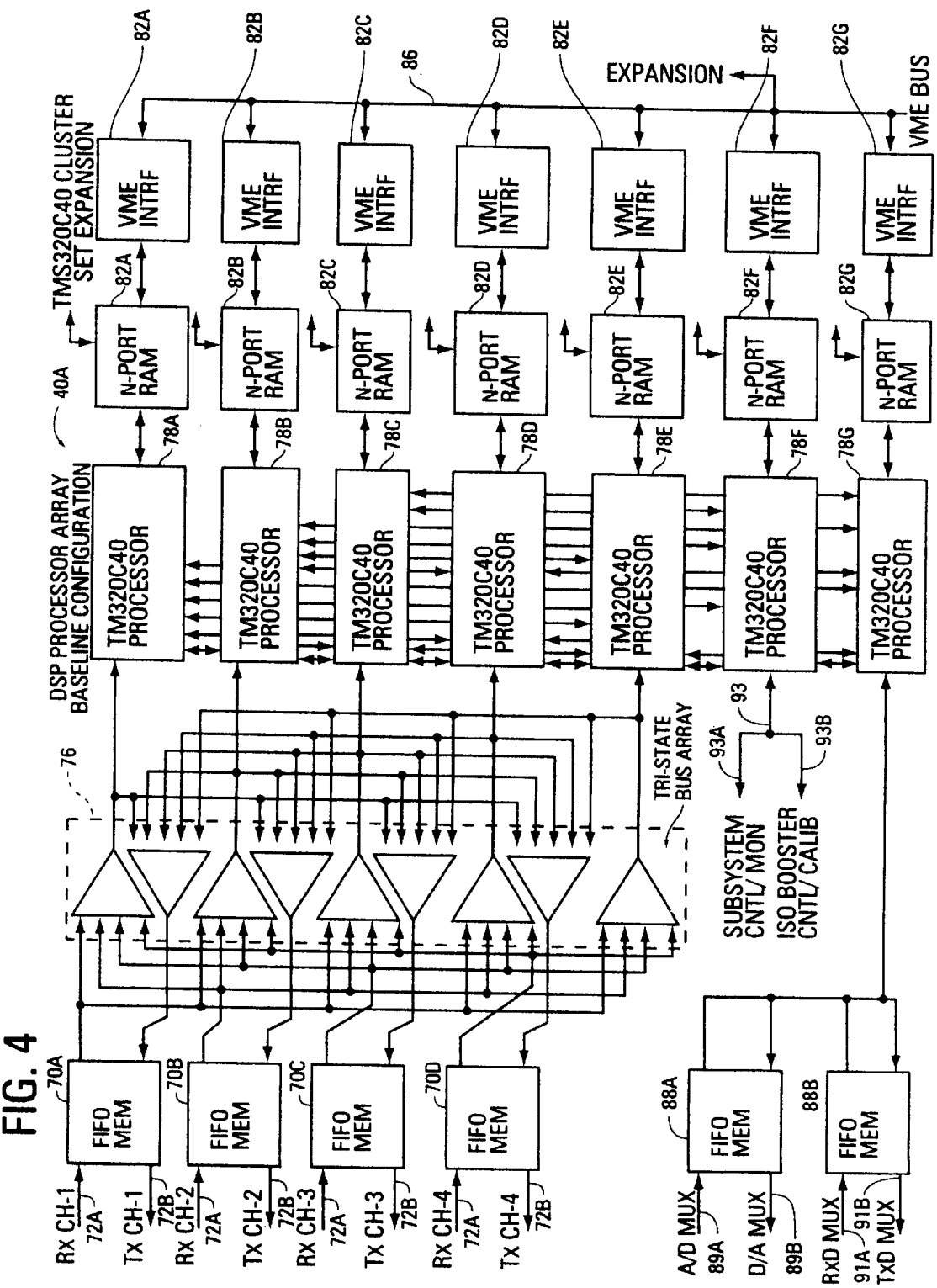
FIG. 4 is a more detailed schematic block diagram of the process array illustrated in FIG. 3.

With reference to FIGS. 3 and 4, processor array 40 includes a set of first in, first out (FIFO) memories 70A–D, a tristate bus array 76, a set of general purpose digital signal processors (DSPs) 78A–G, a corresponding set of N-port random access memories (RAMs) 82A–G, a corresponding set of 32-bit bus interfaces, such as, VME interfaces 85A–G coupled to VME bus 86, and a pair of FIFO memories 88A and 88B coupled to processor 78G. Memories 70A–D include an input 72A for receiving digitally modulated signals from outputs 61A–D and 63A–D, receiver channel circuits 60A–D, and an output 72B for providing digitally modulated signals to inputs 65A–D and 67A–D of exciter channel circuits 64A–D.

Memories 70A–D are coupled via tristate bus array 76 to digital signal processors 78A–E. The main busses (25 MHz, 32-bit) of processors 78A–E are directly coupled to array 76 and to memories 82A–E on a direct memory access (DMA) basis. Processors 78A–G are also coupled to each other via 20 MHz, 8-bit busses. Processors 78F–G also have main busses coupled to memories 82F–G on a DMA basis. Preferably, processors 78A–G are TMS320C40 32-bit floating point processors supporting 25 MHz, 32-bit transfers on each of its main busses. Processors 78A–G are configured to perform up to 1.4 gigaoperations per second (math process operations) and up to 1.8 gigabytes per second of I/O data transfer.

Array 40 advantageously does not require any special or specific processing hardware, such as, fast fourier transform (FFT) processors, correlators, or other devices, which can limit reconfigurability and upgradability. All signal processing functions can be performed in the programmable and general purpose processors 78A–G. Processors 78A–G can perform the necessary waveform generation, reception, and recovery functions associated with system 10. Additionally, DSP 78A–G can be reprogrammed or reconfigured on a situational basis. For example, processor 41 (FIG. 3) in interface 42 can download new configurations or on-line programs for array 40 as required during a mission.

Array 76 directly spreads the processing load across processors 78A–E to accommodate both wide band width and narrow band width signals. Wide band width signals can be segregated into blocks for end-to-end overlap parallel processing in several of processors 78A–E as required. Narrow band width signals can be grouped, multiplexed, and passed to one of processors 78A–E for processing as required. Dynamic allocation of processing resources allows radio system 10 to respond immediately to varying RF signal requirements associated with multi-mode, multi-user, and multi-band applications (e.g., various types and quantities of RF signals).

Processors 78A–G operate according to software stored in N-port RAMs 82A–G. RAMs 82A–G can store program modules, mode control module system status information, and signal status information. The system and signal status information can be provided from interface 42 (FIG. 3) via bus 86. RAMs 82A–G are coupled to VME bus 86 through VME interfaces 85A–G. Processing results, such as, demodulated digital signals or baseband digital signals, can be provided from processors 78A–G to RAMs 82A–G for eventual reception by equipment coupled to interface 42 via bus 86 and interfaces 85A–G.

Additionally, processor 78G can receive and provide message data signals through memory 88B or PCM data representing analog signals, such as, voice, through memory 88A. Message and PCM data signals are time-division multiplexed onto the common data bus to/from multiple user interfaced equipments. Memory 88A includes a PCM data input 89A and a PCM data output 89B coupled to A/D and D/A interface 49 (FIG. 3). Interface 49 provides multiplex/demultiplex circuits to split/combine the PCM data and the A/D and D/A circuits to interface with user analog equipments, such as, microphones and head phones. Memory 88B includes message data input 91A and message data output 91B coupled to data interface 51 (FIG. 3). Interface 51 provides multiplex/demultiplex circuits to split/combine the message data and to interface with user message equipments, such as, teletypes.

Processor 78F includes a data bus interface 93, including a control and monitor data bus 93A and an isolation booster control and calibration data bus 93B. Processor 78F can provide control signals (mute and tune signals) across data bus 93A to control the operation of system 10, as described in more detail below with reference to FIGS. 3–6. Similarly, processor 78F can provide control signals (calibration, mute, tune, and adjust signals) across data bus 93B to processor 39 (FIG. 3).

The size of the set of processors 78A–G, RAMs 82A–G, and interfaces 85A–G can be adjusted for necessary processing capability and memory needs of system 10. For example, the processing capability of array 40 (FIG. 3) can be increased by adding an additional cluster of digital signal processors 78A–G. Processors 78A–G would be coupled to similar numbers of RAMs 82A–G. Array 40 can also be reduced in size and capability for smaller band width applications. In one exemplary embodiment, processor array 40 can be reduced to three processors 78A–C with three 2-port RAMs 82A–C and a reduced capacity array 76.

A properly programmed array 40 can support multi-signal transmission and reception via channel exciter circuits 64A–D and receiver circuits 60A–D with independent gain control, process band width, and full dynamic range. Additionally, array 40 can support high performance, specialized processing operations, such as, correlation, fast fourier transform (FFT), direction finding, distance measurement, surveillance, interference suppression (both external and transmitted), signal acquisition, signal recognition, automatic connection, and automatic forward error correction. Array 40 can further support specialized waveforms, such as, global positioning system (GPS) signals, secure voice-data signals, digitized voice signals, wide band fast frequency hopping signals, direct sequence, low probability intercept (LPI) signals, tactical data links, electronic counter-counter measures (ECCM), and smart electronic counter measures (ECM). Even further still, array 40 can support super node radio relay operations (e.g., multi-signal pass through) and antenna isolation booster calibration functions, as described below with reference to FIG. 7.

Figure 5:
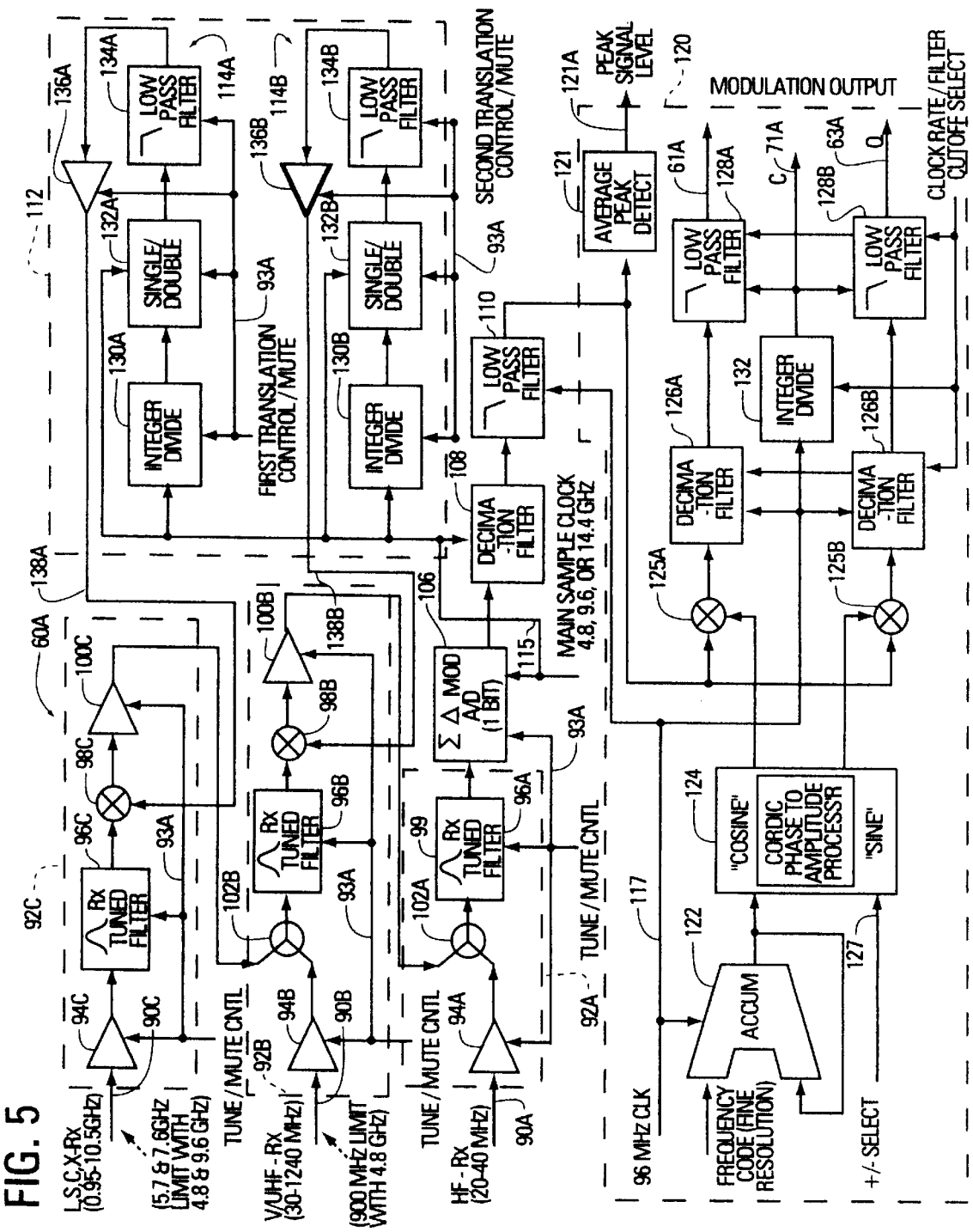
FIG. 5 is a more detailed schematic block diagram of one of the receiver channel circuits illustrated in FIG. 3.

With reference to FIG. 5, a more detailed block diagram of one of receiver channel circuits 60A–D, such as, receiver channel circuit 60A, is shown. Receiver channel circuit 60A is similar to receiver channel circuits 60B–C.

Circuit 60A includes a signal path 92C, a signal path 92B, a signal path 92A, an A/D converter 106, a decimation filter 108, a low-pass filter 110, a clock control circuit 112, and a modulated base band processor 120. Signal paths 92A–C are coupled in series with each other and include inputs 90A–C, respectively. Path 92C is tuned to receive RF signals between 0.95 and 10.5 GHz and includes an amplifier 94C, a tuned filter 96C, a mixer 98C, and an amplifier 100C. Path 92B includes an amplifier 94B, a passive combiner 102B, a tuned filter 96B, a mixer 98B, and an amplifier 100B and is tuned to receive RF signals between 30 and 1240 MHz. Path 92A includes an amplifier 94A, a passive combiner 102A, a tuned filter 96A, and a path output 99. Path 92A is tuned to receive RF signals between 2 and 40 MHz.

Amplifiers 94A–C and 100A–B can be muted by a control signal from array 40 (FIG. 3) on line 93A. Amplifiers 94A–C and 100A–B are muted when RF signals are not present in the appropriate band to reduce sources of noise and interference in system 10.

Array 40 (FIG. 3) also tunes filters 96A–C to an appropriate frequency response via line 93A. Filters 96A–C preselect RF signals in the frequency ranges associated with paths 92A–C, respectively. Filters 96A–C are tuned by a control signal provided on line 93A from array 40. Filters 96A–C are preferably digitally-controlled, miniaturized filters similar to maxi-pole hopping filters manufactured by Pole Zero Corporation, except that filters 96A–C are customized and have an increased number of poles, a widened frequency range response, and provide adjustable Q factors. Nominal tuned filter band widths associated with filters 96A–C can be 100 KHz, 1 MHz, 5 MHz, and up to perhaps 20 MHz. The number of poles required for filters 96A–C is related to the suppression of high level transmit signals. Amplifiers 94A–C and 100A–B, as well as mixers 98A–B, are high level components configured for high RF dynamic range requirements.

Injection signal synthesis circuit 112 includes a synthesis circuit 114A and a synthesis circuit 114B. Synthesis circuits 114A and 114B are coupled to clock bus 115 to receive a clock signal provided by oscillator 55 (FIG. 3). Synthesis circuit 114A includes an integer divider 130A, a single/double circuit 132A, a low-pass filter 134A, and an amplifier 136A. Similarly, circuit 114B includes an integer divider 130B, a single/double circuit 132B, a low-pass filter 134B, and an amplifier 136B. Circuits 132A–B double the clock signal in response to a control signal on data bus 93A. Amplifiers 136A and 136B are controlled by control signals from array 40 (FIG. 3) on data bus 93A. Circuits 114A and 114B provide a synthesized injection signal at outputs 138A and 138B, respectively.

Circuit 112 advantageously provides injection signals up to 10 GHz range without the use of conventional RF synthesizers. Since no fractional division RF synthesizers or digitally-controlled oscillators (DCO) are used, the potential for reciprocally mixing injection distortion products in radio system 10 is minimized. Further, injection frequency change time is reduced to fractions of microseconds rather than the milliseconds associated with conventional radio systems. Moreover, injection frequency channelization control, harmonics suppression control, and injection gain control are performed digitally for circuit 60A via data bus 93A, thereby maximizing process programmability, flexibility, and performance.

Modulated base band processor 120 includes an average peak detect circuit 121, a phase accumulator 122, a coordinate rotation digital computer (CORDIC) phase-to-amplitude processor 124, a multiplier or digital mixer 125A, a multiplier or digital mixer 125B, a decimation filter 126A, a decimation filter 126B, a divider 132, a low-pass filter 128A, and a low-pass filter 128B. Phase accumulator 122 is coupled to a bus 117 which provides a clock signal (at 96 MHz) from divider 57 (FIG. 3). Processor 120 translates the digital signal from filter 110 to a quadrature base band signal that includes the Q data signal and the I data signal.

The operation of receiver channel circuit 60A is discussed below. The RF signals in the 0.95–10.5 GHz range are received at input 90C of path 92C through directional tap 62C (FIG. 3). The RF signals are preselected by filter 96C and down-converted to the frequency range associated with path 92B (30–1240 MHz) by mixer 98C. Mixer 98C receives an injection signal at output 138A of circuit 112 to appropriately down-convert the RF signal. Amplifier 100C provides the down-converted signal to combiner 102B, which provides the converted RF signal to filter 96B of path 92B.

Filter 96B again preselects the down-converted signal, and mixer 98B further down-converts the signal to the frequency range associated with path 92A (2–40 MHz). The twice down-converted signal is provided to amplifier 100B. Mixer 98B receives an injection signal at output 138B of circuit 112 to appropriately down convert the signal.

Amplifier 100B provides the twice down-converted signal to combiner 102A, which provides the down-converted signal to filter 96A of path 92A. The down-converted signal is provided through filter 96A to path output 99 which is coupled to sigma delta modulator or A/D converter 106.

RF signals in the 30–1240 MHz frequency range are received at input 90B of path 92B through splitter 62B (FIG. 3). The RF signals are provided through amplifier 94B and combiner 102B to filter 96B. Filter 96B preselects the RF signal, and mixer 98B down-converts the RF signal to the frequency range associated with path 92A (2–40 MHz).

RF signals in the 2–40 MHz frequency range are received at input 90A of path 92A through directional tap 62A. The RF signals are provided through filter 96A, which preselects the RF signal. The preselected RF signal is provided directly without any down conversion operations to path output 99.

The frequency ranges associated with input 90A, input 90B, and input 90C advantageously overlap to provide increased flexibility for receiving RF signals at various frequency ranges. The frequency ranges given above and the particular number of paths 92B–C are shown in only an exemplary fashion. Alternatively, more paths could be utilized, and different frequency ranges could be utilized.

In summary, paths 92A–C preselect the RF signals and provide an output signal at path output 99 to converter 106. Desired L, S, C, or X band signals are preselected by path 92C and translated into the VHF or UHF band associated with path 92B. The VHF and UHF band signals are further preselected by path 92B and translated into the extended HF band associated with path 92A. The desired extended HF band signals are preselected by filter 96A and passed to converter 106 for typically one-bit serial A/D conversion processing (although a multibit sigma-delta modulation ADC can be used if sufficiently high output linearity can be maintained). The clock signal on bus 115 can be a 4.8, 9.6, or 14.4 GHz clock signal. Converter 106 is tuned (signal frequency channelized) by a control signal from array 40 (FIG. 3) on data bus 93A.

Converter 106 preferably consists of six stages and is clocked at 14.4 GHz via bus 115. Converter 106 can suppress quantization noise as well as aperture jitter over the 40 MHz band width sufficient for full dynamic range performance in a 5 MHz recovery band width. Clocking converter 106 at a lower rate, such as, 9.6 GHz or 4.8 GHz, can result in lower processing speed requirements, but at reduced performance. Both spurious-free dynamic range and maximum RF frequency may be reduced by reducing the clock rate of converter 106.

The signal output by decimation filter 108 and low-pass filter 110 combination reduces the sample rate to 96 megasamples per second (MS/s), resulting in a >40 MHz pass band and a nominally 18-bit S/N resolution and 24-bit linearity (e.g., supports wide recovery band widths and high dynamic ranges). Phase accumulator 122 and CORDIC processor 124 generate digital quadrature injection signals for digital mixers 125A and 125B so processor 120 can perform the Hilbert transformation and translation of the digital signal from filter 110 to a 0 Hz center frequency output signal (modulated base band signal).

Phase accumulator 122 is preferably a 32-bit phase accumulator that performs channelization on less than 0.1 Hz increments. CORDIC processor 124 preferably has a nominal 24-bit output that can produce selectable positive and negative frequency injections via an input 127. The positive and negative frequency injections allow for translation out of the negative 40 MHz band width (image band for the real A/D output of converter 106) and for simultaneous spectrum inversion.

The frequency code input to accumulator 122 and +/−select input to processor 124 are control inputs from DSP processor array 40 (FIG. 4) via data bus 93A. Accumulator 122 and processor 124 are preferably pipelined, thereby having some response delay with respect to new frequency inputs. However, this delay is in the sub-microsecond range when accumulator 122 and processor 124 are clocked by the 96 MHz clock signal on bus 117.

The 96 MHz clock signal on bus 117 is ideal for division to the final output sample rate. The final output sample rate can be at as many as 100 different sample rates from 24 MS/s and down. The base band signal provided by digital mixers 125A and 125B is filtered to the desired output band width and clock rate by decimation filters 126A–B and by low-pass filters 128A–B and then provided to array 40 (FIG. 3). The output signal includes an I signal provided at output 61A, a Q signal provided at output 63A, and a clock signal provided at output 71A. The clock signal is utilized to synchronize circuits 60A and array 40. Peak detection circuit 121 detects the peak level of the signal provided by filter 110 and provides an average peak level detect signal at output 121A for use by antenna isolation processor 39 (FIG. 3).

The architecture associated with receiver channel circuit 60A allows the receiver performance of system 10 to be exceptional by conventional standards. Crossover distortion products can be virtually eliminated with the 40 MHz band width carrier placement range, with the multi-choice RF injections for translation provided by amplifiers 136A–B, accumulator 122, and processor 124, and with the tuned RF filtering associated with filters 96A–C. Unlike conventional radio systems, all automatic gain control (AGC) is ideally performed in array 40 and not in circuit 60A. The AGC algorithms are fully programmable and optimized for the individually recovered signals. The AGC algorithms can be made dynamic and responsive to counter pulse interference. Preferably, system 10 has a dynamic range designed for high performance in multi-signal operation, such as, −119 dBm to +13 dBm RMS in the HF range, −119 dBm to +3 dBm RMS in the V/UHF range, and −119/−99 dBm to −17/+3 dBm RMS in the L, S, C, and X range.

Figure 6:
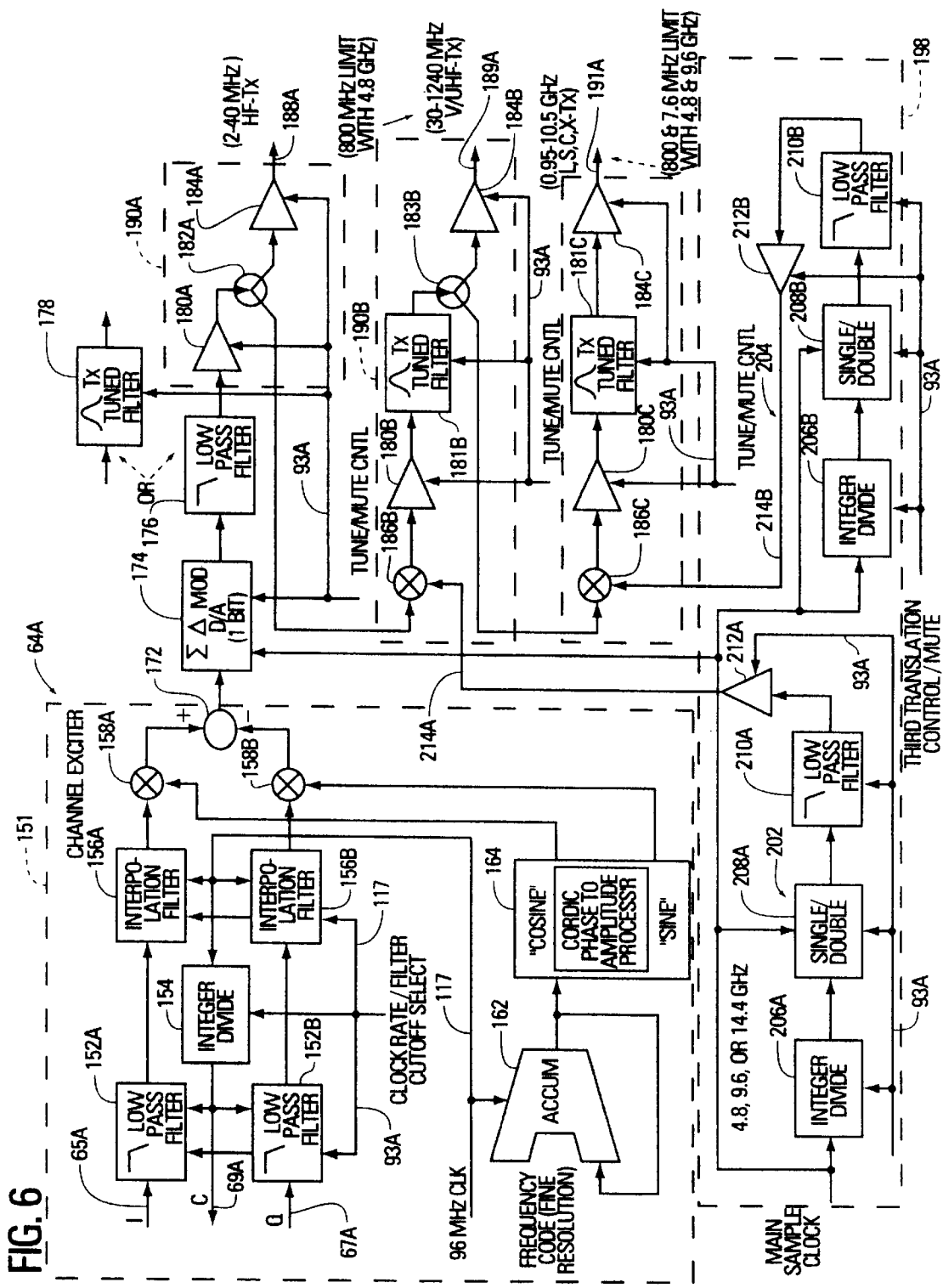
FIG. 6 is a more detailed schematic block diagram of one of the exciter channel circuits illustrated in FIG. 3.

With reference to FIG. 6, an exciter channel circuit 64A is preferably similar to exciter channel circuits 64B–D. Exciter channel circuit 64A is essentially a converse of receiver channel 60A.

Circuit 64A receives modulated digital signals from array 40 at inputs 65A and 67A. Circuit 64A includes a modulated base band processor 151, an injection signal synthesis circuit 198, a digital-to-analog (D/A) converter 174, a low-pass filter 176, an exciter path circuit 190A, an exciter path circuit 190B, and an exciter path circuit 190C. Processor 151 includes a low-pass filter 152A, a low-pass filter 152B, an integer divider 154, an interpolation filter 156A, an interpolation filter 156B, a multiplier or digital mixer 158A, a multiplier or digital mixer 158B, a subtractor 172, a phase accumulator 162, and a CORDIC processor 164.

Synthesis circuit 198 includes a synthesis circuit 202 and a synthesis circuit 204. Synthesis circuit 202 includes an integer divider 206A, a single/double circuit 208A, a low-pass filter 210A, and an amplifier 212A. Synthesis circuit 204 includes an integer divider 206B, a single/double circuit 208B, a low-pass filter 210B, and an amplifier 212B. Path circuit 190A includes an amplifier 180A, a passive splitter 182A, and an amplifier 184A coupled to output 188A. Path circuit 190B includes a mixer 186B, an amplifier 180B, a tuned filter 181B, a passive splitter 182B, and an amplifier 184B coupled to an output 189A. Path circuit 190C includes a mixer 186C, an amplifier 180C, a tuned filter 181C, and an amplifier 184C coupled to an output 191A.

The I data signal is provided through low-pass filter 152A and interpolation filter 156A to digital mixer 158A. Similarly, the Q data signal is provided through low-pass filter 152B through interpolation filter 156B to digital mixer 158B. Phase accumulator 162 and CORDIC processor 164 provide a quadrature injection signal to digital mixers 158A–B. The mixed signals from digital mixers 158A and B are provided to subtractor 172, which then provides a digital modulated real domain signal to D/A converter 174.

Filters 156A–B, integer divider 154, and phase accumulator 162 are clocked by the 96 MHz clock signal on bus 117. A control signal from array 40 (FIG. 3) via data bus 93A adjusts the response of filters 152A–B and 156A–B and the output clock rate of integer divider 154. Converter 174 is preferably a multi-stage, sigma delta modulator. D/A converter 174 compresses the input resolution to a single bit and then converts the bit stream to analog (digital 1 becomes +V and digital 0 becomes −V, where V is an appropriate voltage level). Converter 174 maintains high resolution, linearity, and low noise floor by resampling the digital signal input at preferably 14.4 giga samples per second (for best performance) and by suppressing the noise and distortion in the compressed one-bit resolution. The transmit linearity and noise floor suppression should be as good as or better than the error and noise floor suppression associated with receiver channel circuit 60A (FIG. 5).

The analog signal from converter 174 is preferably in the 2–40 MHz frequency range. The analog signal is provided through low-pass filter 176 to path 190A. Alternatively, filter 176 can be replaced by a tuned filter 178. Tuned filter 178 is tuned by a control signal on data bus 93A to have a frequency response with a tunable reduced band width associated with path 190A (2–40 MHz).

Filter 178 can be utilized to further suppress the transmit noise floor in the RF pass band of receiver channel circuits 60A–D. Amplifier 180A amplifies and provides the analog signal from filter 176 to splitter 182A. Splitter 182A provides the amplified signal to amplifier 184A, which provides the analog signal to output 188A. Additionally, splitter 182A provides the analog signal to mixer 186B in signal path 190B.

Mixer 186B receives an injection signal from synthesis circuit 202 at output 214A. Synthesis circuit 202 is preferably similar to synthesis circuit 112, as discussed with reference to FIG. 5. Synthesis circuit 202 is controlled by data bus 93A and converts the analog signal from splitter 182A to the frequency range associated with path 190B (30–1240 MHz). Amplifier 180B amplifies and provides the converted signal to filter 181B. Filter 181B provides the converted signal to splitter 182B. Splitter 182B provides the signal to mixer 186C in path 190C and to amplifier 184B, which provides a signal to output 189A.

Mixer 186C up-converts the signal to the frequency range associated with path 190C. Synthesis circuit 204 provides the appropriate injection signal at output 214B. Mixer 186C provides the twice up-converted signal through amplifier 180C to tuned filter 181C. Tuned filter 181C is controlled by control signal on data bus 93A. Tuned filter 181C provides the signal to amplifier 184C, which provides it to output 191A.

Filters 176, 178, 181A, and 181B provide frequency selection operations for paths 190A, 190B, and 190C and are controlled from data bus 93A by array 40 (FIG. 3). Additionally, amplifiers 180A–C and amplifiers 184A–C are controlled by control signals provided on data bus 93A from array 40. Array 40 controls the operation of circuit 64A so the appropriate frequency RF signal is provided at outputs 188A, 189A, and 191A.

Exciter path circuit 64A advantageously does not require fractional division RF synthesizers or (DCOs), thereby suppressing spurious generation of signals and maintaining the noise floor at a low level. Additionally, the architecture of receiver channel circuit 60A and exciter channel circuit 64A lends to channel transceiver implementations (see FIG. 9).

Converter 174 preferably has a nominal 24-bit resolution for transmit 5 MHz band width signals. With suitable transmit and receiver pass band offsets, filter selectivity, and transmit-to-receive antenna isolation, the transmit noise floor will be sufficiently low so as not to degrade receiver sensitivity levels during simultaneous operation conditions. Amplifiers 180A–C and 184A–C, mixers 186B–C, and filters 176, 178, and 181B–C are preferably high level components.

System 10 can simultaneously transmit and receive four signals in any of the frequency ranges by utilizing each of exciter channel circuits 64A–D and receiver channel circuits 60A–D. Additionally, if any two RF signals are close enough together in frequency, the two signals can be filtered within the same receiver channel circuit, such as, receiver channel circuit 60A, or within the same exciter channel circuit, such as, exciter channel circuit 64A. The two signals can be simultaneously demodulated or modulated by array 40 (FIG. 3). However, if the signals are spaced too far apart, multiple exciter channel circuits 64A–D or multiple receiver channel circuits 60A–D will be needed to simultaneously transmit or to receive both signals. For example, when multiple signals fall within the same subband filter band width, a single channel can be used to receive the total band width. For instance, a 5 MHz filter band width may contain many signals, all of which could be received by a single receiver channel circuit 60A. The subband of signals could be separated, identified, translated individually to base band, demodulated, and recovered in array 40.

Figure 7:
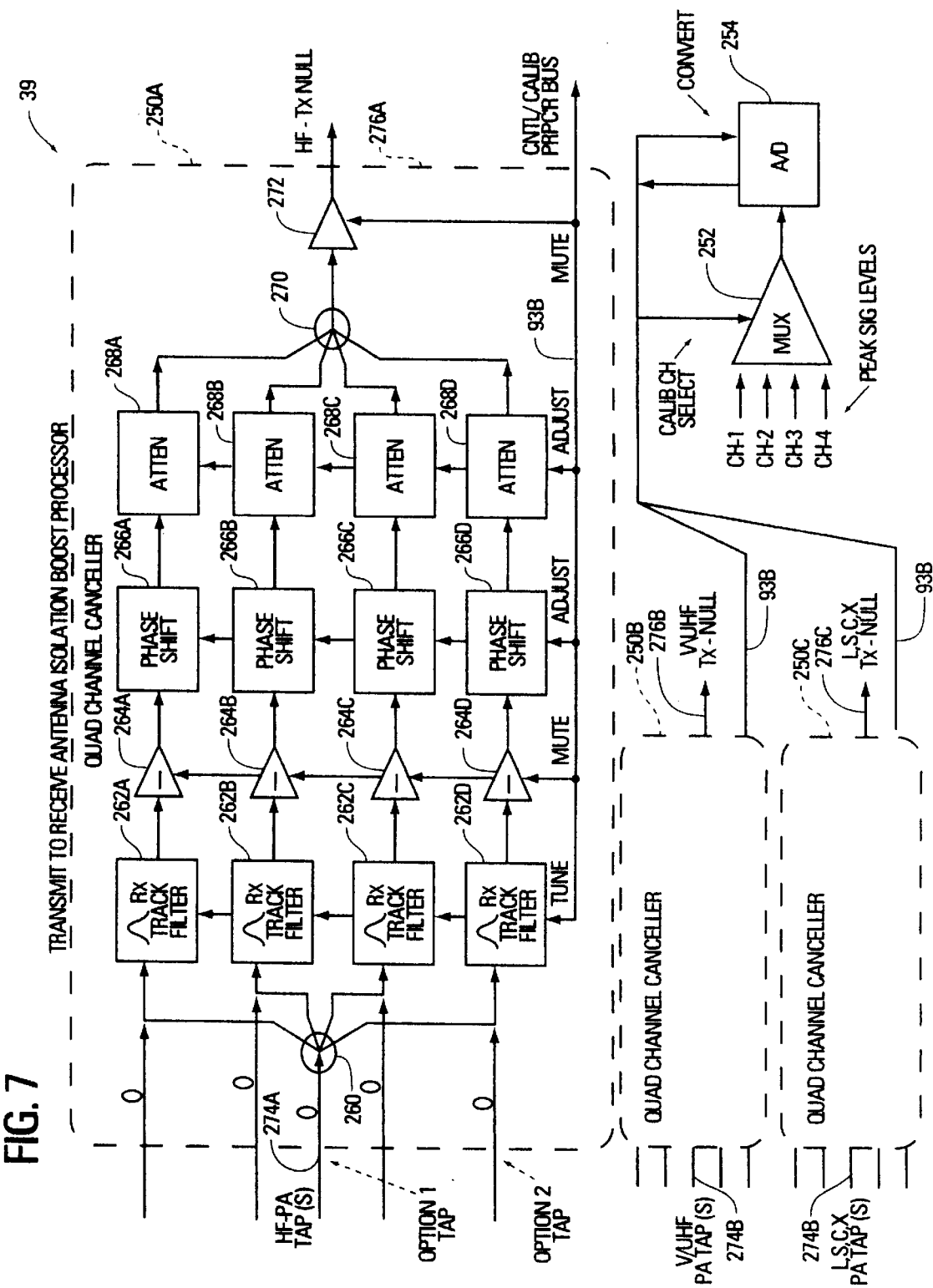
FIG. 7 is a more detailed block diagram of the antenna isolation processor illustrated in FIG. 3.

With reference to FIG. 7, antenna isolation boost processor 39 includes an HF band quad channel canceler 250A, a V/UHF band quad channel canceler 250B, an L, S, C, X band quad channel canceler 250C, a multiplexer 252, and an A/D converter 254. Quad channel cancelers 250B and 250C are similar to quad channel canceler 250A, except that they are tuned for their appropriate frequency band.

Quad channel canceler 250A includes a passive splitter 260, a tuned filter 262A, a tuned filter 262B, a tuned filter 262C, a tuned filter 262D, an inverting amplifier 264A, an inverting amplifier 264B, an inverting amplifier 264C, an inverting amplifier 264D, a phase shifter 266A, a phase shifter 266B, a phase shifter 266C, a phase shifter 266D, an attenuator 268A, an attenuator 268B, an attenuator 268C, an attenuator 268D, a passive combiner 270, and an amplifier 272. Passive splitter 260 receives analog RF signals in the HF frequency range at input 274A from amplifier 36A. Splitter 260 provides the signal at input 274A to filters 262A–D. Filters 262A–D are tuned by a control signal on data bus 93B from array 40 (FIG. 3).

The signal is provided through inverting amplifiers 264A–D, phase shifters 266A–D, and attenuators 268A–D to combiner 270. Combiner 270 provides the combined signal to amplifier 272, which provides the combined signal at output 276A. Filters 262A–D, inverting amplifiers 264A–D, phase shifters 266A–D, and attenuators 268A–D are controlled by control signals provided on data bus 93B from array 40.

If four separate analog signals in the HF range are being provided through power amplifier 36A, control signals on data bus 93B tune filters 262A–D to the four analog signals and invert, phase-adjust, and level-adjust them in order to ultimately subtract them from the receive signals on antenna 30B in combiner 37A (FIG. 3). Similarly, the control signals on data bus 93B can select one, two, or three of amplifiers 264A–D, filters 262A–D, phase shifters 266A–D, and attenuators 268A–D in accordance with the number of transmitted signals provided in the HF frequency range. Quad channel cancelers 250B and C operate to receive the analog signals provided by amplifiers 36B and C, respectively, and to provide an inverse of the analog signals at outputs 276B and C, respectively, and on to combiners 37B and C, respectively.

Transmit carrier, noise, and distortion products that fall within the RF pass band of receiver channel circuits 60A—D and exceed the idle noise floor of receiver channel circuits 60A–D can desensitize receiver channel circuits 60A–D. The transmit carrier associated with the analog signals can even block receiver channel circuits 60A–D, if transmitter-to-receiver frequency offset selectivity and transmitter-to-receiver antenna isolation are insufficient relative to the transmit signal power level. Assuming normal suppression of power amplifier harmonics within amplifiers 36A–D, distortion products probably will not block receiver channel circuits 60A–D. However, the transmit carrier can block receiver channel 60A–D without the use of processor 39.

Processor 39 preferably provides a 25 dB minimum spurious and noise level suppression within the pass band of receiver channel circuits 60A–D. The power amplifier outputs are tapped at a low level, windowed to receive the particular pass band by filters 262A–D, and phase and gain-adjusted by circuits 266A–D and 268A–D to cancel the transmit signal from the receive signal.

Array 40 (FIG. 3) determines the window pass bands which are being received in receiver channel circuits 60A–D. The Q factor of phase shifters 266A–D is adjustable to control the rate of change in phase shift across the pass band. The settings for filters 262A–D, phase shifters 266A–D, and attenuators 268A–D are table-driven based on transmit carrier frequencies and on transmit and receive filter settings. The booster settings can be calibrated during idle periods via low level excitations from array 40. During calibration, setting adjustments are made to seek a minimum received average peak signal level on coupled transmit carriers.

Although the coupled transmit carrier levels will not normally block receiver channel circuits 60A–D, additional suppression of the coupled transmit carrier, intermodulation, and spurious levels in the recovery pass band may be required at times, especially for wide recovery band widths. For narrow recovery band widths, most, if not all, of the needed suppression is provided by the combination of receiver RF filtering in circuits 64A–D, receiver modulation base band filtering, and transmitter-to-receiver frequency offset. For wide band width receive signals, adaptive filtering and/or interference suppression and cancellation in DSP processor array 40 can be used to further suppress the transmit carrier level that falls within the recovery pass band. Such techniques can include transmit signal match notch filters and direct cancellation of transmit modulation in the receive signal after appropriate frequency shifts, gain, and phase adjustments are made. If the recovery band width signals are spread spectrum in nature, they provide a certain amount of interference suppression during demodulation processes.

With reference to FIG. 8, a system 300 is similar to system 10. However, system 300 includes an amplifier circuit 36, including four amplifiers 302A, four amplifiers 302B, an four amplifiers 302C. Amplifier outputs are routed to antenna couplers 33A–C via four sets of directional taps 304A, 304B, and 304C. System 300 provides additional suppression of intermodulation distortion over that of system 10. However, system 300 requires four times as many power amplifiers as system 10, thereby increasing space, weight, and power required for system 300. Directional taps 304A–C have the low level signal taps routed to antenna isolation boost processor 39, where the implied signal combining (FIG. 8) is actually performed after amplitude and phase processing (FIG. 7).

With reference to FIG. 9, system 400 is similar to system 10 except that IF circuit 38 includes a transceiver channel 402A, 402B, 402C, and 402D. Additionally, multi-channel duplexers 408A, 408B, and 408C are included in coupler 32. Multi-channel duplexers 408A–C are coupled to a broad band receive and transmit antenna 410. System 400 advantageously reduces the channel and antenna hardware, thereby providing a better configuration for mobile applications. However, only two full duplex channels can be utilized from the four half duplex transceivers, as opposed to four full duplex channels in receiver system 10. System 400 (as well as systems 10 and 300) can provide a larger number of simultaneous operations in applications where multiple transmit signals can share a common RF pass band and where multiple receive signals can share a different common RF pass band.

It is understood that, while the detailed drawings, specific examples, and particular values given describe preferred exemplary embodiments of the present invention, they are for the purpose of illustration only. The apparatus and method of the present invention is not limited to the precise details of the conditions disclosed. For example, although particular clock rates and frequency ranges are described, various clock rates and frequency ranges can be utilized. Further, although receiver, exciter, and transceiver channel sets are in groups of four, other groups of fewer or greater numbers can be utilized. Further still, single lines shown in the drawings can represent plural conductors. Thus, changes may be made to the details disclosed without departing from the spirit of the invention, which is defined by the following claims.

What is claimed is:

1. A radio system, comprising:
a receiver means for receiving a plurality of receive modulated analog signals and for generating a plurality of receive modulated digital signals representative of the receive modulated analog signals, the receive modulated analog signals being in at least one of a first, a second and additional receive frequency ranges, the receive modulated analog signals in the first receive frequency range being directly converted to the receive modulated digital signals, the receive modulated analog signals in the second and additional frequency ranges being converted to the first receive frequency range and thereafter converted to the receive digital modulated signals;

a digital processing means for receiving the receive modulated digital signals and for demodulating the receive modulated digital signals, the processing means generating a plurality of transmit modulated digital signals; and a transmitter means for receiving the transmit modulated digital signals and for generating a plurality of transmit modulated analog signals representative of the transmit modulated digital signals, the transmit modulated analog signals being in at least one of a first, a second, and additional transmit frequency ranges, the transmit modulated digital signals being directly converted to the transmit modulated analog signals in the first transmit frequency range, the transmit modulated analog signals in the second and additional transmit frequency ranges being converted from the first transmit frequency range to the second and additional transmit frequency ranges whereby the modulated receive analog signals can be received simultaneously, and the modulated transmit analog signals can be transmitted simultaneously.

2. The radio system of claim 1, wherein the receiver means includes a first receiver converter for converting the receive modulated analog signals in the second receive frequency range to the first receive frequency range.

3. The radio system of claim 2, wherein the receiver means includes a second receiver converter for converting the receive modulated analog signals in a third receive frequency range to the second frequency range, the first receiver converter converting the receive modulated analog signals in the second frequency range from the second receiver converter to the first frequency range.

4. The radio system of claim 1, wherein the transmitter means includes a first exciter converter for converting the transmit modulated analog signals in the first transmit frequency range to the second transmit frequency range.

5. The radio system of claim 4, wherein the transmitter means includes a second exciter converter for converting the transmit modulated analog signals in the second transmit frequency range to a third transmit frequency range.

6. The radio system of claim 1, wherein the radio system is capable of multi-user, multi-mode, and multi-band performance.

7. The radio system of claim 6, wherein the radio system is a direct sampling receiver system for the receive modulated analog signals in the first receive frequency range and a direct transmitting system for the transmit modulated analog signals in the first transmit frequency range.

8. The radio system of claim 1, wherein the first transmit frequency range is equal to the first receive frequency range, the second, and additional transmit frequency ranges are equal to the second and additional receive frequency ranges respectively.

9. An architecture for a radio system, comprising:
a plurality of receiver channels, each receiver channel being coupled to an antenna to receive a plurality of receive modulated analog signals and generating a corresponding plurality of receive modulated digital signals representative of the receive modulated analog signals, the receive modulated analog signals being in a first receive frequency range or in a second receive frequency range, the receive modulated analog signals in the second receive frequency range being converted to the first frequency range, receive modulated analog signals in the first frequency range being directly converted to the receive modulated digital signals;

a digital signal processing array coupled to the receiver channels, the digital signal processing array demodulating the receive modulated digital signals and generating a plurality of transmit modulated digital signals; and a plurality of transmitter channels coupled to the digital signal processing array and to the antenna, each transmit channel receives a plurality of transmit modulated digital signals and generates a corresponding plurality of transmit modulated analog signals representative of the transmit modulated digital signals, the transmit modulated analog signals being in a first transmit frequency range or in a second transmit frequency range, the transmit modulated digital signals in the second transmit frequency range being directly converted to the transmit modulated analog signals in the second transmit frequency range, the transmit modulated analog signals in the first frequency range being converted from the first frequency range to the second frequency range, whereby the modulated receive analog signals can be received simultaneously, and the modulated transmit analog signals can be transmitted simultaneously, and whereby the modulated receive analog signals can be received simultaneously with the transmission of the modulated transmit analog signals.

* * * * *